May 19, 1970 F. W. SIERACKI 3,513,442

DATA RETRIEVAL AND QUOTE BOARD MULTIPLEX SYSTEM

Filed April 28, 1967 6 Sheets-Sheet 1

INVENTOR
FRANK W. SIERACKI

BY [signature]

ATTORNEYS

DATA RETRIEVAL AND QUOTE BOARD MULTIPLEX SYSTEM

Filed April 28, 1967 6 Sheets-Sheet 2

INVENTOR
FRANK W. SIERACKI
BY
[signature]
ATTORNEYS

DATA RETRIEVAL AND QUOTE BOARD MULTIPLEX SYSTEM

FIG. 3 QB Message Converter

INVENTOR
FRANK W. SIERACKI
BY
ATTORNEYS

DATA RETRIEVAL AND QUOTE BOARD MULTIPLEX SYSTEM

Filed April 28, 1967

6 Sheets-Sheet 4

FIG. 4 QB Message Retriever

INVENTOR
FRANK W. SIERACKI
BY Pennie Edmonds Morton Taylor & Adams
ATTORNEYS

DATA RETRIEVAL AND QUOTE BOARD MULTIPLEX SYSTEM

Filed April 28, 1967 6 Sheets-Sheet 5

R/R Data Retriever

INVENTOR
FRANK W. SIERACKI

BY [signature]
ATTORNEYS

Data Terminus

INVENTOR
FRANK W. SIERACKI
BY Pennie Edmonds Morton Taylor & Adams
ATTORNEYS

United States Patent Office 3,513,442

Patented May 19, 1970

3,513,442

DATA RETRIEVAL AND QUOTE BOARD MULTIPLEX SYSTEM

Frank W. Sieracki, Philadelphia, Pa., assignor to Ultronic Systems Corp., Pennsauken, N.J., a corporation of Delaware Filed Apr. 28, 1967, Ser. No. 634,603
Int. Cl. H04q *5/00, 11/00*
U.S. Cl. 340—154 11 Claims

ABSTRACT OF THE DISCLOSURE

Updating quote board (QB) messages are transmitted on reply lines connecting respective data retrievers and data terminus units of a request/reply data retrieval system serving respective pluralities of request units. A reply to any line initiates a QB message in the next bit interval and the message has a single bit sync section. During a QB message, a reply (if ready) is inhibited. QB data is stored until a plurality of QB units transmitting independently on respective reply lines are simultaneously ready to receive it. Each data terminus sends a sync section to a quote board during a respective reply and distinctively terminates it in the text bit interval. The QB message data is sent thereafter as it is received. Reception of a reply enables transmission of the next request and vice versa. Reception of a QB message delays enabling reception of a reply.

CROSS-REFERENCES TO RELATED APPLICATIONS

The multiplex system of the present invention may be used in the request/reply data retrieval systems described in U.S. Pat. No. 3,281,788, granted Oct. 25, 1966, to Hernan et al., and in U.S. application Ser. No. 334,098, filed Dec. 30, 1963, by Hunkins et al., now U.S. Pat. No. 3,359,541, to supply updating messages to the Quote Board System described in U.S. application Ser. No. 542,057, filed Apr. 12 ,1966, by Gertler et al., now U.S. Pat. No. 3,416,134.

BACKGROUND OF THE INVENTION

Pat. No. 3,281,788 describes a data retrieval system particularly designed for supplying information on stocks and the like to a large number of requesting units used by stockbrokers, etc. Price and other categories of information are stored at a central location in a cyclic memory such as a magnetic drum. Consoles or desk units (D/U) for making requests and displaying replies are located at remote points such as in stockbrokers' offices and are connected via a data collector (D/C) to a data terminus (D/T). At the memory, an output unit is provided which serves a plurality of data retrievers (D/R) in sequence. Each data retriever is connected to a corresponding data terminus via communication lines providing transmission in both directions therebetween. The desk units connected to a given data terminus are enabled in sequence and the respective request is transmitted by the data terminus to the associated data retriever. The latter supplies the request to the memory output and obtains a corresponding reply therefrom. This reply is transmitted back to the data terminus and thence to the requesting desk unit.

In order to serve stockbrokers all over the country, several memories called "slaves" are located in appropriate large cities and kept up to date from a master memory. Each slave may serve a number of data retrievers via one or more slave output units, and each retriever is connected via communication lines to a remote data terminus which may serve a considerable number of desk units. Hence service to a large number of brokers is provided.

U.S. Pat. No. 3,359,541 is an improvement on the aforesaid system and provides a system in which each data retriever can serve several remote data terminus units. Thus if there are several stockbroker offices in a city remote from the slave station, several data terminus units can be used to serve the several offices, with only one set of long distance communication lines (for transmission in both directions) required to connect the several data terminus units with the corresponding retriever.

For convenience in this application, systems of the foregoing type will be called "request/reply" systems, and the corresponding units and messages will be designated "R/R" when required.

U.S. Pat. No. 3,416,134 describes a quotation board system for stocks and the like in which large boards are provided in stockbrokers' offices for displaying prices of a selected number of stocks. The boards are kept up to date by messages transmitted thereto from a central location. Inasmuch as the slave memories contain the required information for updating the quotation boards, one or more slave stations around the country are provided with equipment for assembling the updating messages.

For convenience hereinafter, "quote board" will be used and the corresponding units and messages designated "QB" as required.

Communication lines, particularly long distance lines are a considerable item of expense in such systems. Since frequently both R/R desk units and a quote board are used in the same brokerage office, or at least in the same city, it is desirable to utilize the same communication lines for both services, insofar as possible. Although multiplexing is frequently used in communication systems to utilize lines more efficiently, the two services described above pose special problems.

The request/reply systems described above do not transmit replies at regular intervals, since the search times required to obtain replies vary considerably and in a random manner. Further, it is desired to supply a given updating QB message to a plurality of reply lines, and the replies on each line have random spacings independent of the other lines both because of the random search time and the sequential servicing of requests from data retrievers connected to a given slave output unit. In addition, the request/reply systems are expected to receive requests and furnish replies without substantial delay and in practice a request can be made at any time during the work day and a reply usually obtained without appreciable delay. Multiplexing should not substantially impair the speed of this service. On the other hand, rapid updating of the quote boards as stock prices change is also important.

The present invention provides a multiplexing system which meets these requirements quite adequately, and in an economical manner.

SUMMARY OF THE INVENTION

In accordance with the invention, updating QB data is supplied to a first unit termed a QB message converter and transferred to a plurality of second units termed QB message retrievers. The QB retrievers are connected to respective reply transmission circuits between R/R data retrievers and data terminus units. Means at each QB retriever is responsive to the end of a reply at the corresponding R/R retriever to initiate the transmission of a QB message at a predetermined interval thereafter, advantageously in the next bit interval. The QB message has a short sync section, advantageously only one bit. The presence of this bit following a reply at a fixed interval enables the identification of a QB message. The transmission of a given QB message from different QB retrievers takes place at different times, depending on when replies from the respective R/R retrievers are sent. When a given message has been sent from all QB retrievers, the absence of message data therein jointly enables the transfer thereto of new data from the QB message converter. The transfer advantageously takes place at a substantially higher speed than message transmission.

In this manner a given QB updating message is sent out over all associated reply lines, despite the irregular occurrence of replies therein.

After a given R/R reply, a new request is transmitted to the R/R data retriever, and during the request the reply line is not used in the R/R system. Hence during the request the QB message does not interfere. However, the QB message is longer than an R/R request, and, if the R/R search time is short, provision is made to inhibit an R/R reply until the end of the QB message. The delay is minor, as will be explained.

At each data terminus an initial portion of a sync section is transmitted to an associated quote board during the receipt of an R/R reply, and a final portion during the interval allocated to the initial sync section of a QB message. Then the data in a received QB message is supplied to the quote board as it is received. This avoids any need for storing the QB message at the data terminus, while providing the desired identifying sync pattern to a quote board.

The R/R systems employ a register at each data terminus for receiving a reply. At the end of a reply the register is inhibited from receiving signals from the reply transmission circuit until after the next request has been made, whereupon it is again enabled. In the multiplex system of the invention, means responsive to the receipt of a QB message are provided for delaying the enabling of the register. Thus, if a QB message is being received, the R/R reply register is inhibited until its completion. On the other hand, if a QB message is not received, the reply register is promptly enabled so that it can receive an R/R reply obtained after only a short search of the memory. Advantageously the control circuit for inhibiting the reply register simultaneously enables the supply of data to the quote board, and vice versa. Thus the delay in again enabling the reply register both prevents QB data from entering the register and prevents cutting off the QB data to the quote board.

These and further features of the invention will in part be pointed out, and in part be understood by those skilled in the art, from the following description of the specific embodiment. It will also be understood that certain features of the invention may be employed, and others omitted, depending on the requirements of a particular application.

DESCRIPTION OF THE PREFERRED EMBODIMENT

Figure 1:
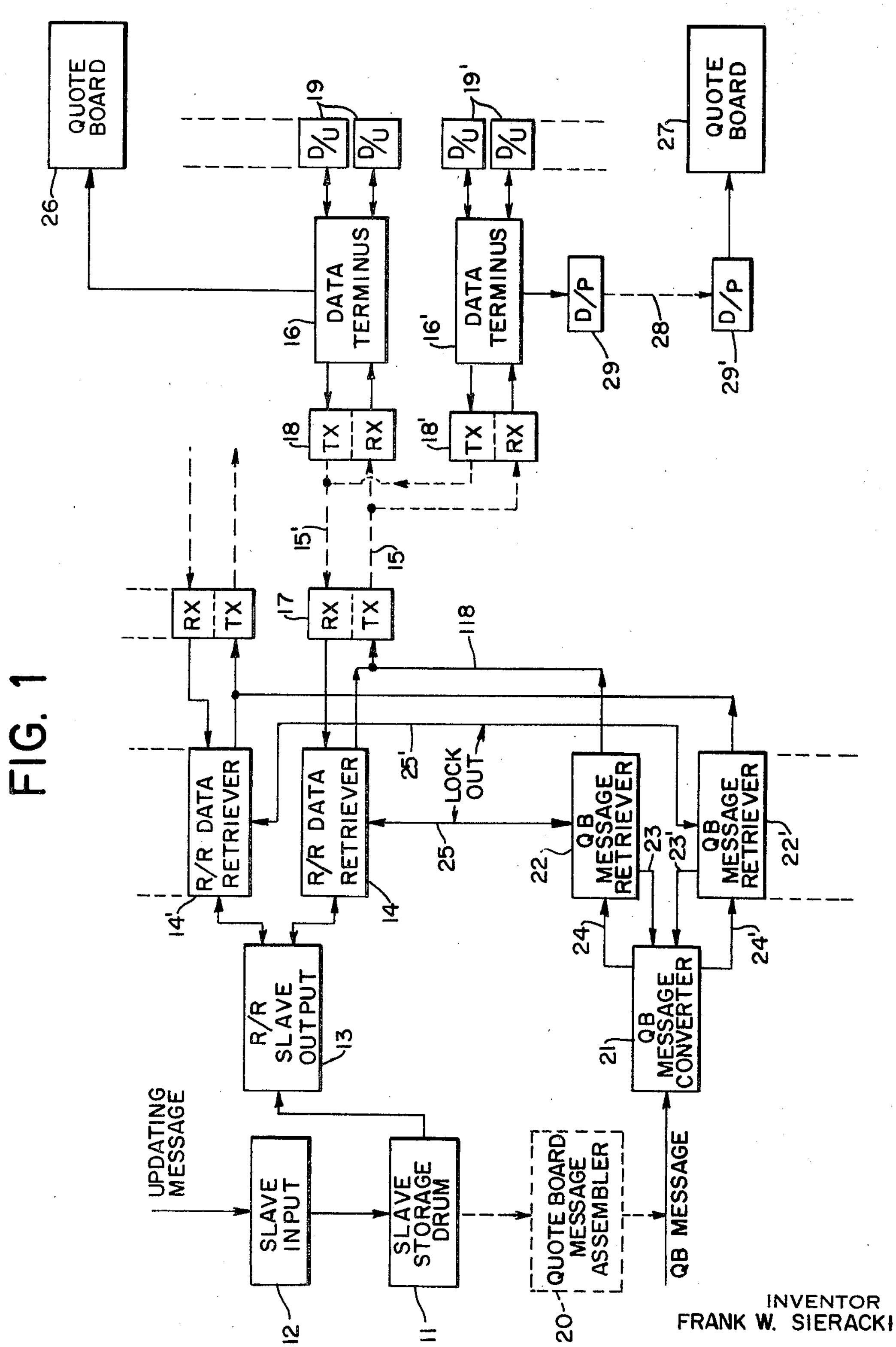
FIG. 1 is a block diagram of the overall system of the invention.

Referring to FIG. 1, the quote board message system is shown multiplexed with a Request-Reply quotation system of the type described in the aforesaid U.S. Pat. No. 3,359,541.

Considering the Request-Reply portion first, information is stored in a memory such as a slave storage drum 11, and is kept current by updating messages applied to the slave input 12. A slave output 13 receives requests from a plurality of R/R data retrievers 14, 14', locates the information on the storage drum 11, and delivers it to respective retrievers. Each retriever 14 is connected via transmission circuits 15, 15' such as telephone lines to a plurality of data terminus units 16, 16'. Transmitting annd receiving data sets 17, 18, 18' are provided at each end of the transmission lines to convert the messages into proper form for transmission. TX designates the transmission portions and RX the receiving portions. Each data terminus 16 receives requests from, and supplies replies to, a plurality of consoles or desk units 19, 19'. U.S. Pat. No. 3,359,541 shows the data terminus connected to the DU's via one or more data collectors, but these are omitted here for simplicity.

In operation, the plurality of DU's 19 connected to data terminus 16 are enabled in sequence. Each DU makes a request and receives a reply before the next DU is enabled. With the plurality of data terminus units shown, a reply from the data retriever 14 to data terminus 16 contains an address portion for the next data terminus 16' and the latter is then enabled to make a request and receive a reply. Then a subsequent data terminus unit (not shown) is enabled. When all data terminus units have been served, the first one is again enabled, and the operation repeated cyclically. The data retrievers 14, 14' are enabled in succession to make requests to the slave output 13, and as soon as a reply is delivered to one data retriever the next is enabled.

The search times involved in obtaining reply data from the memory drum for different requests vary considerably, and in a random manner. Consequently, the time intervals between successive replies on a given reply line 15 are not uniform, but vary considerably and in a random manner. The same is true of successive requests on a given request line 15'.

Considering now the quote board portion of FIG. 1, updating messages designated "QB Message" are received from one of the slave stations and delivered to a QB message converter 21. This may be physically located at one of the slave stations and the updating messages may be obtained from the storage drum 11 at that station, as indicated by the dotted box 20, or from another slave station. One or more QB message retrievers 22, 22' may be utilized, depending upon requirements and the number of R/R data retrievers available at the slave station. When all QB retrievers are ready to receive a new message, they so inform the converter via lines 23, 23' and the message in the converter is transferred thereto via lines 24, 25'. Each QB message retriever 22, 22' uses the communication facilities of a corresponding R/R data retriever 14, 14' as indicated. Thus, the QB messages are multiplexed with R/R messages, as will be described in detail hereinafter. Mutual lock-out circuits 25, 25' are provided so that a given QB message retriever 22 cannot deliver a message to the communication unit 17 while the corresponding R/R data retriever 14 is delivering a message thereto, and vice versa.

At the data terminus units, QB messages are delivered to the quote boards associated therewith. If the quote board is in the same location as the data terminus, as shown at 26, direct connections may be used. In some instances the quote board may not be in the same location, as shown at 27, and may be connected to the corresponding data terminus 16' by means of a communication line 28 and corresponding dataphones 29, 29'.

Figure 2:
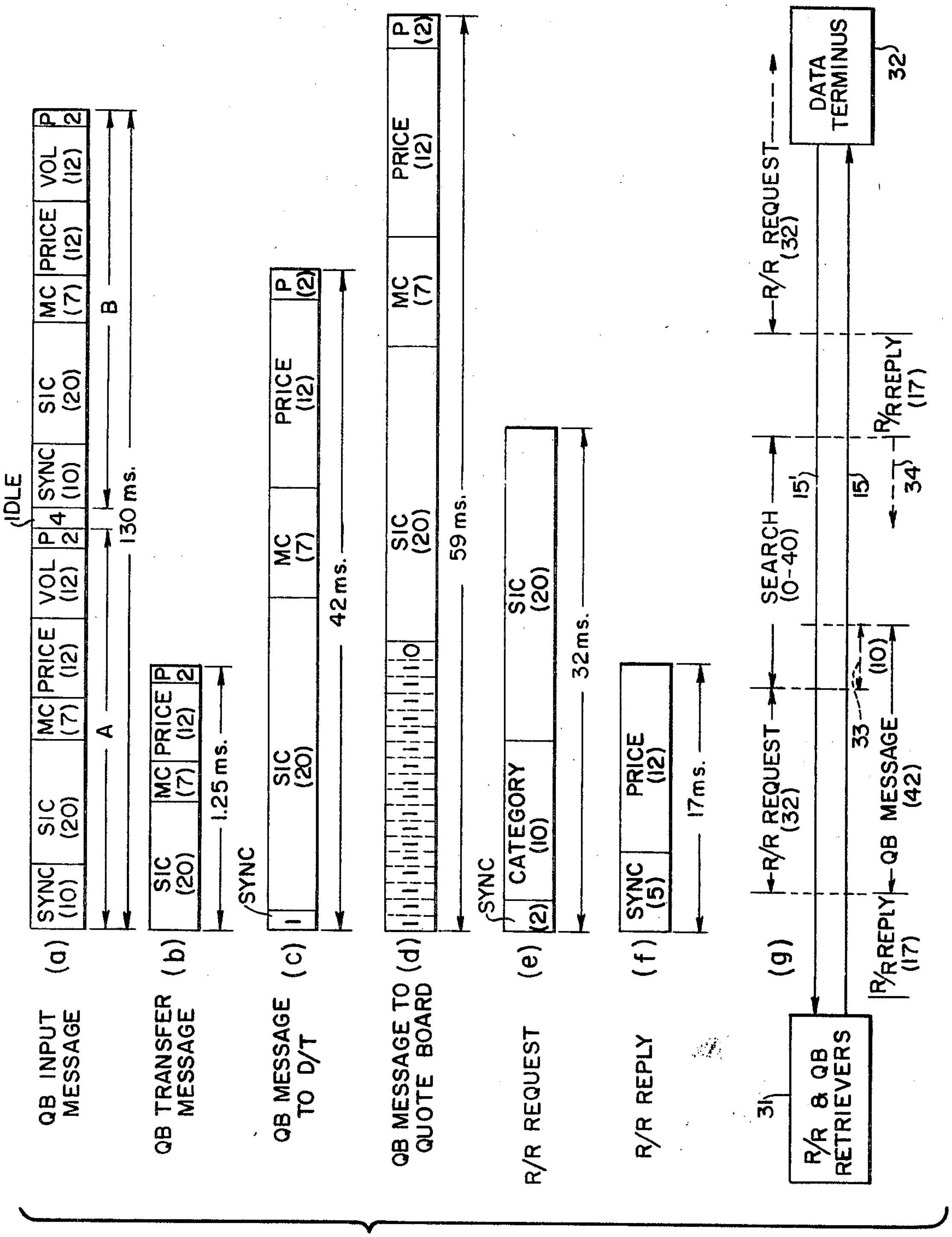
FIGS. 2*a–g* show formats of signals used at various points in the system and a timing diagram of the multiplexed messages.

Referring to FIG. 2, examples of specific message formats used at various points in the system of FIG. 1 are shown. It will be understood that the formats may be altered as meets the requirements of a particular application.

An initial quote board updating message is shown in FIG. 2(*a*), and is the type of message supplied to converter 21 in FIG. 1. It is shown comprising sections A and B, which are duplicate transmissions of the same updating message to promote accuracy and reliability. Each section begins with a 10-bit sync section followed by a 20-bit SIC section for identification of the stock, a 7-bit MC section which designates the type of information on that stock contained in the message, a 12-bit price section for Last, Close, etc. prices, a 12-bit volume section, and a 2-bit parity section. There is then a short 4-bit idle period, followed by section B of the message. This message is explained in further detail in the aforesaid U.S. Pat. No. 3,416,134. Assuming a transmission rate of 1000 bits per second, the overall message lasts 130 milliseconds, as indicated. As explained in the application, the volume section is not actually used at the present time for quote board information.

FIG. 2(*b*) shows a QB transfer message for transferring information from the converter 21 to QB retrievers 22, 22' in FIG. 1. It has a 20-bit SIC section, a 7-bit MC section, a 12-bit price section, and a 2-bit parity section. Here the transmission rate is much higher, such as 32 kHz. (kilohertz), so that the overall message lasts only about 1.25 milliseconds.

FIG. 2(*c*) shows a QB message transmitted over transmission line 15 to the data terminus units. It begins with an initial 1-bit sync pulse, followed by SIC, MC, etc., as before. With a transmission rate of 1 kc., the message lasts 42 milliseconds.

FIG. 2(*d*) shows a QB message delivered by a data terminus to a quote board. As shown, it has an 18-bit sync section composed of 17 1-bits followed by a 0-bit. This is followed by SIC, etc. and gives a message totalling 59 milliseconds. As described in U.S. Pat. No. 3,416,134, nine or more 1-bits followed by a 0-bit are used for message identification, since this is sufficiently unique. As subsequently described, the 1-bits shown are generated during an R/R reply. If the R/R reply is 18 bits, as mentioned below, the sync section will have eighteen 1-bits followed by a 0-bit. Actually, in the specific embodiment described hereinafter, more 1-bits may be generated than shown, depending on the drum search time.

FIG. 2(*e*) shows an R/R request message transmitted from a data terminus to a data retriever. It has a 2-bit sync section, a 10-bit category section and a 20-bit SIC section. The category may be Last price, Close, Open, etc. The message lasts 32 milliseconds, at a 1 kHz. transmission rate.

FIG. 2(*f*) shows an R/R reply from retriever to data terminus having a 5-bit sync section and a 12-bit price section, totalling 17 milliseconds. In some installations, a 6-bit sync section is employed, but the present explanation will be based on the format shown.

FIG. 2(*g*) shows the timing of the multiplexed messages. Box 31 indicates the R/R and QB retrievers connected to one set of transmission lines 15, 15', and box 32 shows the corresponding data terminus at the other end of the lines. The data sets 17, 18 are assumed included in the boxes. Time in milliseconds is shown in parentheses under each legend. The timing diagram begins with an R/R Reply on line 15. Immediately after the end of the reply, an R/R request is transmitted in the opposite direction on line 15'. At the same time, a QB message is transmitted on line 15. As will be noted, the QB message is longer than the R/R request. At the R/R retriever, the request is supplied to the slave output 13 and reply data obtained. The search time required to obtain a reply to a given request depends on the location of the stock on the storage drum with respect to the time the request is received, and is random. At the present time a maximum of 40 milliseconds is required to obtain a reply, and it may be much shorter. Thus a search time of 0 to 40 milliseconds is shown in the figure.

If the search is completed within the first 10 ms. after receipt of a request, the transmission of the reply is held up until the end of the QB message. Thus the 10 ms. interval shown by the double-headed arrow 33 cannot be used for an R/R reply if a QB message is being transmitted. This occasional delay in transmitting an R/R reply is not serious in practice. A couple of milliseconds are commonly required to obtain a reply under the most favorable circumstances, making the maximum delay about 8 ms. Further, the majority of requests will require more than a 10 ms. search period, and in these cases no delay will be involved. Thus the prompt service required for the R/R system is not seriously impaired by the multiplexing of QB messages with R/R replies. On the other hand, the complete cycle for an R/R request and reply averages 70–80 ms., so that little delay in transmitting a QB message is likely to occur.

As soon as the QB message ends, an R/R reply can be transmitted. The exact time of transmission will depend on the search time, as indicated by arrow 34. At the end of an R/R reply, a new R/R request can be made.

Several features of the invention can be pointed out with the aid of FIG. 2. To minimize the delay in transmitting R/R replies requiring only a short search time, a QB message is transmitted immediately after an R/R reply, and the QB message is kept as short as practicable. To this end the QB message starts in the next bit interval after an R/R reply and only a single 1-bit sync pattern is employed. The presence of a 1-bit in this bit interval serves to identify a QB message at the Data Terminus. Inasmuch as R/R replies are not uniformly spaced on line 15, the end of a given reply is used to enable the transmission of a QB message, if one is ready at that time.

The QB message to the quote board requires a longer sync pattern, as shown in FIG. 2(*d*). Provision is made to generate the initial portion of the sync section while an R/R reply is being received, and completing it as the initial 1-bit of the QB message is received. The subsequent sections of the QB message are then retransmitted as they are received. Thus no delay is involved in sending the message to the quote board, no storage is required at the Data Terminus, and the Data Terminus is immediately ready to receive the next R/R reply.

The logic diagrams shown in subsequent figures use digital logic elements. Many types of elements are known in the art and may be used as desired to perform the functions hereinafter described. The specific embodiment here shown uses NOR logic units, examples of which are given in the aforesaid Patent 3,281,788, FIGS. 6–8, and in U.S. Pat. No. 3,416,134, FIGS. 28(*a*), 28(*b*). Their functioning will be described at this time to facilitate understanding the diagrams.

Figure 3:
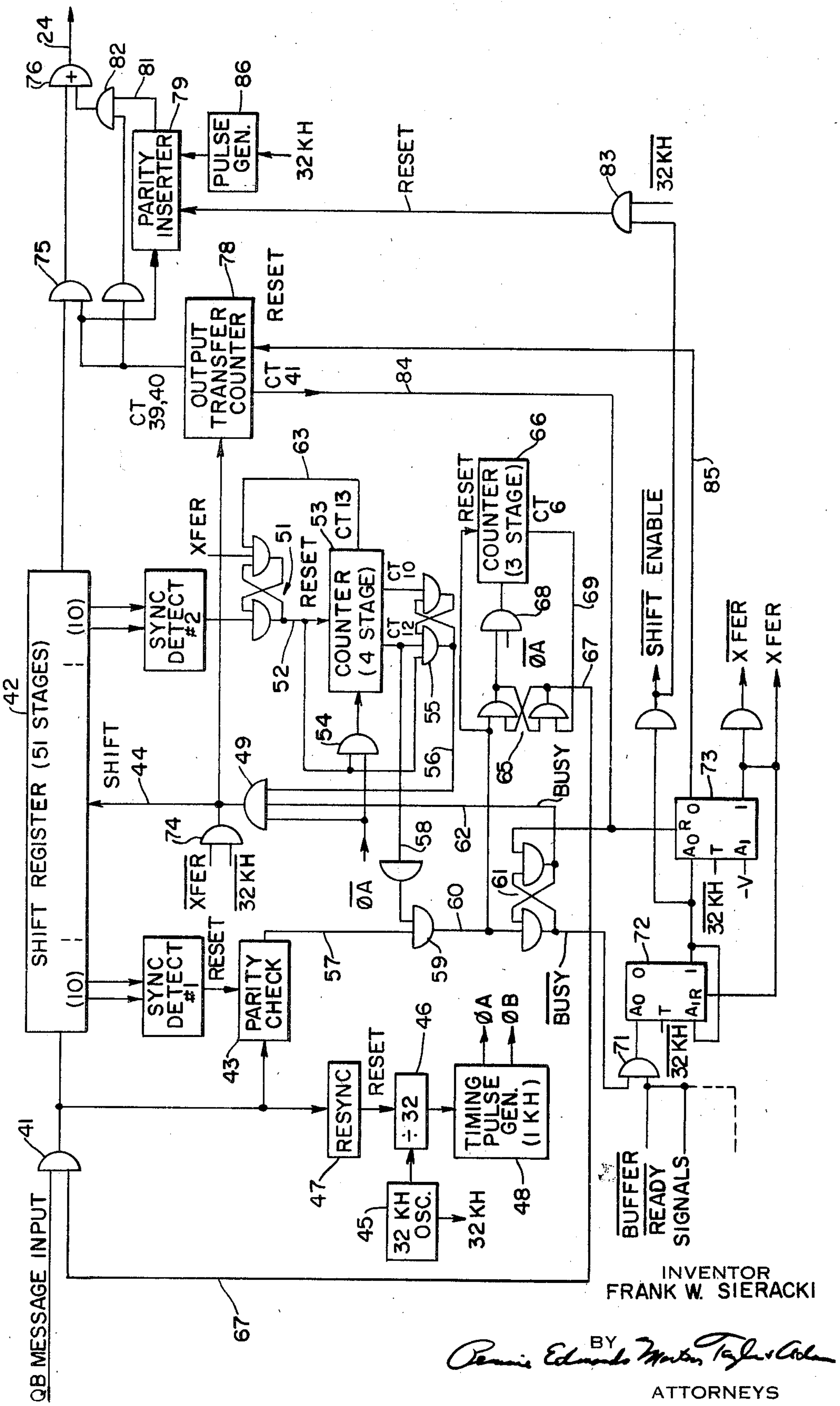
FIG. 3 is a logic diagram of the quote board message converter.

A gate such as shown at 41 in FIG. 3 has a plurality of inputs and one output. If any input line is high (say ground potential), the output line is low (say negative). If all input lines are low, the output line will be high. Thus, the gate functions as an AND gate with polarity inversion for input signal whose assertion levels are low and as an OR circuit with inversion for signals whose assertion levels are high. If only one input line is used and the others left unconnected, the gate functions as a polarity inverter.

Two such gates may be cross-connected as shown at 51 to form a D-C flip-flop. A high signal to either side will cause the output of that side to go low, and the output of the other side to go high. The terms "set" and "reset" will be used hereinafter to designate the two possible states of the flip-flop, and are selected arbitrarily as seems convenient.

An A-C flip-flop such as shown at 72 in FIG. 3 is a bistable multivibrator having steering inputs A0 and A1 and corresponding outputs 0 and 1. The FF is triggered by a positive-going signal to the T input and reset by a positive-going signal to the R input. In the reset state the "0" output is high and the "1" output low. In the set state the outputs are reversed. If the steering inputs are high to A0 and low to A1, a trigger signal will set the flip-flop. If the steering inputs are low to A0 and high to A1, a trigger signal will reset the flip-flop. A shift register such as shown at 42 may be constructed of a number of A-C flip-flops interconnected in known manner. Counters may also be made of A-C flips-flops in known manner.

Both barred and unbarred signals are shown in the drawings, and are the inverse of each other. Usually the assertion level of an unbarred signal is high, and that of a barred signal is low.

Referring to FIG. 3, updating QB messages having the format of FIG. 2(*a*) are applied through gate 41 to a 51-stage shift register 42, and to a parity check circuit 43. Register 42 is shifted by pulses in line 44, as will be decsribed. Sync detector #1 is connected to the first ten stages of the register and, when the sync pattern is recognized, resets parity check 43. The latter then operates on the remainder of section A of the message and checks parity in known manner.

Timing pulses for shifting and other purposes are developed in a manner similar to that described in Pat. 3,281,788. Assuming a 1 kHz. message bit rate, a 32 kHz. oscillator 45 supplies pulses to a divide-by-32 counter 46. A resynchronizer 47 is arranged to produce resetting pulses for counter 46 on rising edges of message pulses supplied thereto, thereby maintaining the cycling of the counter in synchronism with the message bit intervals. Counter 46 drives timing pulse generator 48. The latter uses respective counts of 16 and 32 to produce $\phi$A pulses at a 1 kHz. rate in the middle of each message bit interval and $\phi$B pulses at the end of each bit interval (and beginning of the next).

Gate 49 controls the supplying of shift pulses to register 42 during the input cycle. Assuming for the moment that the other inputs to gate 49 are low, $\overline{\phi A}$ pulses are inverted by gate 49 and shift the register at the middle of each bit interval of the message input.

Sync Detector #2 is connected to the last ten stages of register 42. When the sync pattern reaches the end of the register, detector #2 sets FF51, thereby making its output line 52 low. This releases the reset on counter 53, which is a four-stage counter arranged to yield outputs at counts of 10, 12 and 13 as shown. The low line 52 also enables gate 54, thereby passing $\phi$A pulses to the counter. When ten pulses have been counted, FF55 is set, making output line 56 high and closing gate 49 to stop further shifting of register 42. At this time the sync pattern will have passed out of the register and been discarded, and the remainder of the message except for the parity bits will be in the register. The two parity bits will, however, pass to Parity Check 43, and this circuit is designed to give a low output in line 57 if parity is good, and a high output if there is an error. At a count of 12, line 58 will go high and, by inversion, will be low at gate 59. If parity is good, line 57 will be low and the gate output line 60 will go high to set Busy FF61. The Busy line 62 will go high to mtaintain gate 49 closed, the Busy signal indicating that a good message is now locked in register 42. The count of 12 in counter 53 will also reset FF55, removing the inhibiting signal in line 56 to gate 49. After the count of 12, line 58 will go low and, by inversion, will close gate 59. At a count of 13, a high signal in line 63 will reset FF51, thus resetting counter 53, closing gate 54 and holding FF55 reset.

The content of register 42 is now available for transfer to the QB message retrievers. The transfer may or may not take place immediately, depending on whether the retrievers are ready, as will be described. When the transfer has taken place, Busy FF61 will be reset, as will be described, and section B of the message can enter register 42. Section B should be discarded, however, since section A has been found to be good. This operation will be described before proceeding to the output (transfer) cycle.

When line 60 goes momentarily high to set Busy FF61, it also sets FF65 and resets counter 66. Setting FF65 makes line 67 high, thereby closing gate 41 at the input to register 42. When line 60 goes low after a count of 12 from counter 53, the reset on counter 66 is removed. The prior setting of FF65 makes the output to gate 68 low, and $\phi$A pulses are applied to counter 66. At a count of 6, line 69 goes high to reset FF65. This closes gate 68 and opens gate 41. If, during the 4 ms. interval between sections A and B of the message, register 42 has been emptied and input cycle shifting resumed, the 6 ms. delay in reopening gate 41 will have eliminated the first two bits of the sync pattern of section B, so that a valid sync pattern will not be recognized by the Sync Detectors and Section B will be discarded.

On the other hand, if section A is not found to be good, section B should be operated upon. If no valid sync pattern is found for section A, or if the parity is in error, it will be shifted out of register 42 without being utilized. Thus, an invalid sync pattern will not set FF51, and the high line 52 will hold counter 53 reset and hold FF55 reset, so that line 56 will not close gate 49. Line 58 will remain low, maintaining gate 59 closed, so that the busy FF61 will not be set to close gate 49. If sync is good but parity is in error, line 57 will be high at a count of 12 and FF61 will not be set. In either case section A will be shifted out of register 42 and discarded. As section B arrives, gate 41 will be open since FF65 will remain reset (from a previous operation), and line 67 will not close the gate. Accordingly, section B will be processed as described for section A, and if valid will be stored in register 42, ready for transfer.

Transfer of the message in register 42 to the QB message retrievers 22, 22' (FIG. 1) takes place at high speed in the output cycle. Pulses at 32 kHz. from oscillator 45 are used for the purpose. Transfer does not take place until the QB retriever registers are empty and ready to receive a new message. As will be described later in connection with FIG. 4, the retrievers develop low $\overline{\text{BUFFER READY}}$ signals when ready, and they are applied to gate 71 in FIG. 3. With a good message in register 42, the Busy FF will be set and $\overline{\text{BUSY}}$ to gate 71 will be low. The resultant high output is delivered to the A0 input of FF72. This FF is in its reset state at this time, its "1" output is low, and the back-connection makes the A1 input low. Thus the FF is steered toward set. The next $\overline{\text{32KH}}$ pulse to its trigger input T sets FF72 at its trailing edge, giving a high 1-output which is inverted to give a low $\overline{\text{SHIFT ENABLE}}$.

The high 1-output of FF72 steers FF73 toward set and the next $\overline{\text{32KH}}$ pulse sets it, giving a high 1-output which resets FF72 and produces a high XFER signal, and by inversion produces a low $\overline{\text{XFER}}$.

The low $\overline{\text{XFER}}$ is applied to gate 74 along with $\overline{\text{32KH}}$ pulses, hence supplying high frequency shift pulses to register 42. The accompanying high XFER is applied to FF51 to hold it reset, so that counter 53 cannot operate during the output transfer cycle. The message in register 42 passes through gate 75 and OR76 to the output transfer line 24.

Output Transfer Counter 78 counts the message bits passing through gate 75. It is originally held reset by the high 0-output of FF73 in line 85. When FF73 is set, the counter is released and counts the shift pulses applied to register 42. At a count of 39, the thirty-nine bits of SIC, MC and Price stored in register 42 will have passed through gate 75. Counts 39 and 40 are recognized and close gate 75 to exclude the volume section of FIG. 2(*a*) which was stored in register 42 but is unnecessary for quote board use at the present time.

The message bits are supplied to a Parity Inserter 79 to produce the proper two parity bits in line 81 at the end of the message. Gate 82 is enabled during counts 39, 40 so that the parity bits can pass to OR76 and line 24. The Parity Inserter can be designed in known manner. It is here shown reset just prior to the beginning of the output shifting by $\overline{\text{SHIFT}}$ $\overline{\text{ENABLE}}$ and a $\overline{\text{32KH}}$ pulse applied to gate 83. A pulse generator 86 sharpens 32KH pulses and supplies them to the parity inserter so as to sample the middle portions of the message bits.

Accordingly, a transfer message is delivered to line 24 having the format of FIG. 2(*b*). A count of 41 in output counter 78 makes line 84 high to reset FF73. This makes $\overline{\text{XFER}}$ high to close gate 74 and stop the transfer shifting, and the high 0-output in line 85 resets counter 78 and holds it until the next output cycle begins. The high line 84 also resets FF61, thereby causing the BUSY signal to go low at gate 49, ready for the next input cycle. $\overline{\text{BUSY}}$ goes high to inhibit gate 71 until another input message is present in register 42. XFER from FF73 to FF51 goes low to release the latter, ready for the next input signal.

Figure 4:
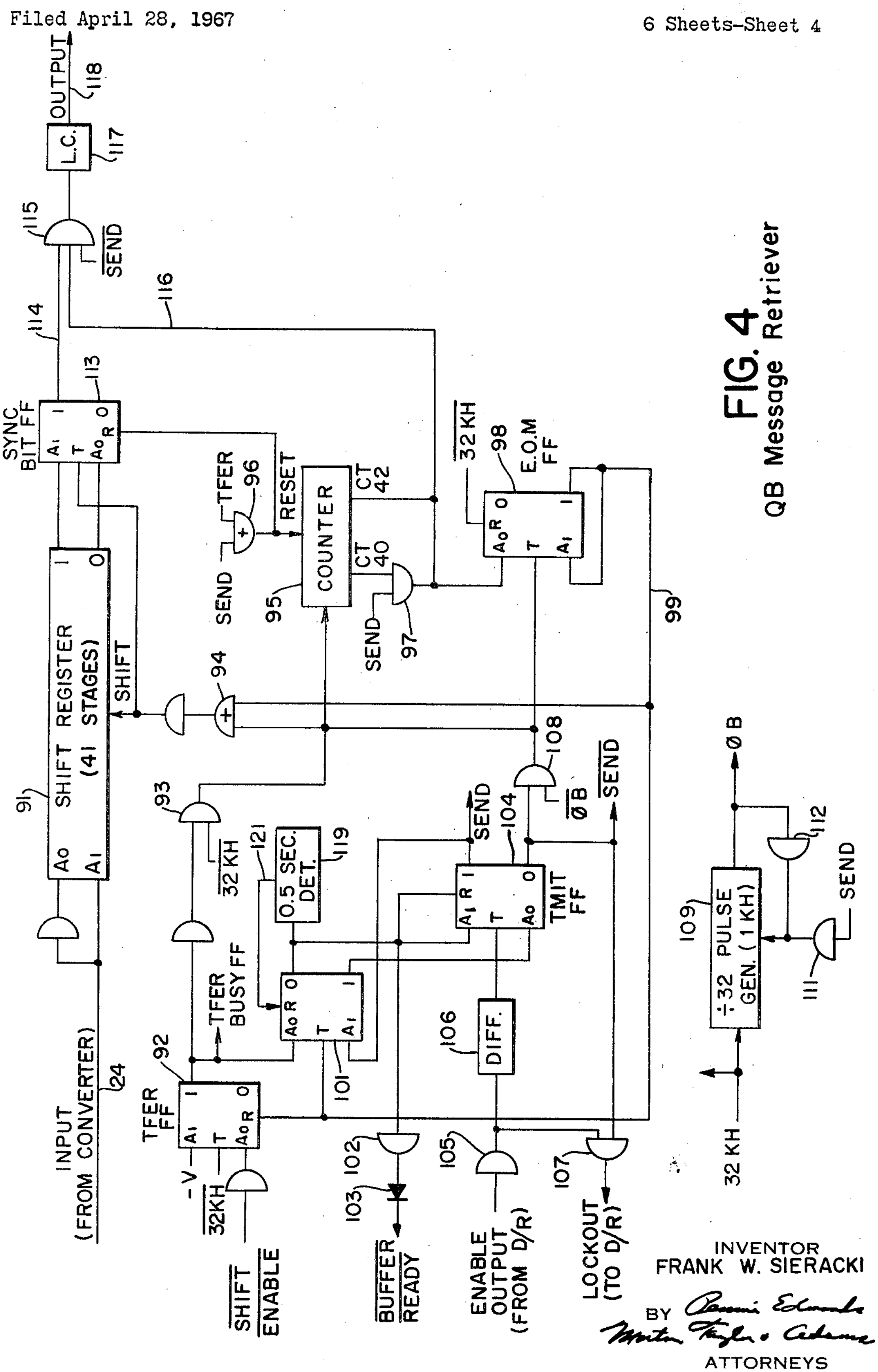
FIG. 4 is a logic diagram of the quote board message retriever.

Referring to FIG. 4, the transfer message in line 24 is applied to a shift register 91 having 41 stages to receive the entire message. Register 91 is shifted synchronously with the output shifting of the converter register by supplying 32 kHz. pulses from converter to retriever. The transfer cycle is controlled by TFER FF92, TFER being used here instead of XFER to avoid confusion. $\overline{\text{SHIFT}}$ $\overline{\text{ENABLE}}$ from FIG. 3 goes low just prior to sending the transfer message, and is inverted and applied to steer FF92 toward set. The next $\overline{\text{32KH}}$ pulse sets FF92 at its trailing edge, and the 1-output denoted TFER goes high. This is inverted and enables gate 93 to supply 32 kHz. pulses through OR94 and an inverter to shift register 91.

The shift pulses are also applied to counter 95. This counter is normally held reset by low SEND and TFER signals to OR96, which make its output high. When TFER goes high, the output of OR96 goes low and releases the counter. A count of 40 is recognized and supplies a low signal to gate 97 which, along with a low SEND signal, gives a high gate output to FF98. The next shift pulse sets E.O.M. FF98 (End of Message) and the resultant high 1-output to line 99 resets TFER FF92, thereby closing gate 93 to stop the shifting. The high line 99 also sets Busy FF101 to indicate that a message is locked in register 91. In addition, line 99 is connected to OR94 to insure that a full-length 41st shift pulse is applied to the register. A $\overline{\text{32KH}}$ pulse resets FF98 at its trailing edge.

With Busy FF101 set, its 0-output is low and is inverted by 102 to yield a high $\overline{\text{BUFFER}}$ $\overline{\text{READY}}$ signal which is sent back to gate 71 in the converter of FIG. 3, thereby preventing transfer of another message, as already described. Diode 103 permits connecting $\overline{\text{BUFFER}}$ $\overline{\text{READY}}$ signals from other retrievers to gate 71 without interaction. The outputs of FF101 are connected to TMIT FF104 to steer it toward set. The low 0-output releases the reset on FF104.

The QB retriever is now ready to transmit a message to a data terminus, but this is not done until the end of a reply from the associated R/R data retriever, as explained in connection with FIGS. 1 and 2(*g*). As will be explained later for FIG. 5, while an R/R retriever is transmitting a reply it produces a high ENABLE OUTPUT signal, and this signal goes low at the end of the reply. The signal is applied to inverter 105 and differentiator 106 to trigger FF104 at the end of the R/R reply. The setting of FF104 makes SEND high and $\overline{\text{SEND}}$ low. The latter is applied to gate 107 along with the output of inverter 105, to deliver a high LOCKOUT signal to the R/R data retriever. This will be explained further hereinafter.

The low $\overline{\text{SEND}}$ enables gate 108 to supply $\phi$B shift pulses through OR94 to shift register 91. The pulses are also applied to counter 95. The reset of counter 95 is released when SEND to OR96 goes high, and the shift pulses from gate 108 are counted.

The $\phi$B pulses are produced by generator 109 similarly to those produced in FIG. 3. However, the normally low SEND signal to inverter 111 keeps generator 109 reset until transmission is to take plate. The feedback of $\phi$B pulses through inverter 112 insures that the divide-by-32 counter starts from reset at each cycle.

As shown in FIG. 2(*c*) the output message begins with a 1-bit. This is accomplished by FF113 which has been held reset by the high output of OR96, and released when SEND went high. The 1-output is supplied via line 114 to gate 115. At this time line 116 is low and $\overline{\text{SEND}}$ is low. Thus the state of the 1-output of FF113 is delivered to the level changer 117 and output line 118 to the reply transmission circuit. The level changer serves to provide proper signal levels to the TX section of 17 (FIG. 1) for transmission over line 15.

In this embodiment a low input signal in line 24 and a low output signal in line 114 corresponds to a mark or 1-bit. Consequently, when gate 115 is initially enabled by a low $\overline{\text{SEND}}$, the low 1-output of FF113 delivers a mark to output line 118. The shift pulses to register 91 are also applied to FF113, and subsequent outputs in line 114 will correspond to the signal bits in the register.

As the shift pulses are counted in 95, the count of 40 will be ineffective since SEND is high to gate 97. A count of 42 corresponds to the end of the message and is recognized to make line 116 high and close gate 115. It also is high at the A0 input to FF98, and the FF is set by the next $\phi$B pulse from gate 108. The resultant high output to line 99 resets Busy FF101, and the 0-output of the latter goes high to reset TMIT FF104. $\overline{\text{SEND}}$ goes high to inhibit gate 108 and terminate shifting of register 91, and holds gate 115 closed until the next output cycle. SEND to OR96 and gate 97 goes low, allowing the counter to function for the next transfer cycle as described above.

The reset of FF101 makes the $\overline{\text{BUFFER}}$ $\overline{\text{READY}}$ signal low, indicating the QB retriever is now ready for another transfer message. The resetting of FF104 makes the LOCKOUT signal low, removing the inhibition on the R/R data retriever so that an R/R Reply can be transmitted.

If, due to faulty operating conditions, a message in register 91 fails to be transmitted, the system could hang up. In this embodiment a QB message should be transmitted in less than 0.5 second after its receipt. Accordingly a 0.5 second detector 119 is supplied with the 0-output of FF101. The detector is designed so that 0.5 second after its input goes low, its output line line 121 will go high to reset FF101 unless the FF has already been reset by line 99 at the end of a message transmission. This enables a new transfer cycle to begin.

It should be noted that the transmission of a message from the QB retriever is contingent upon TMIT FF104 being set by a differentiated pulse from the trailing edge of the ENABLE OUTPUT signal at the end of an R/R reply. If at this instant the Busy FF104 is not set, indicating that a message is not yet ready in register 91, the steering inputs to FF104 will not be in the direction toward set. Consequently, FF104 will not be set and the message transmission must await the end of the next R/R reply. This assures that a QB message will always start immediately after the end of an R/R reply.

Figure 5:
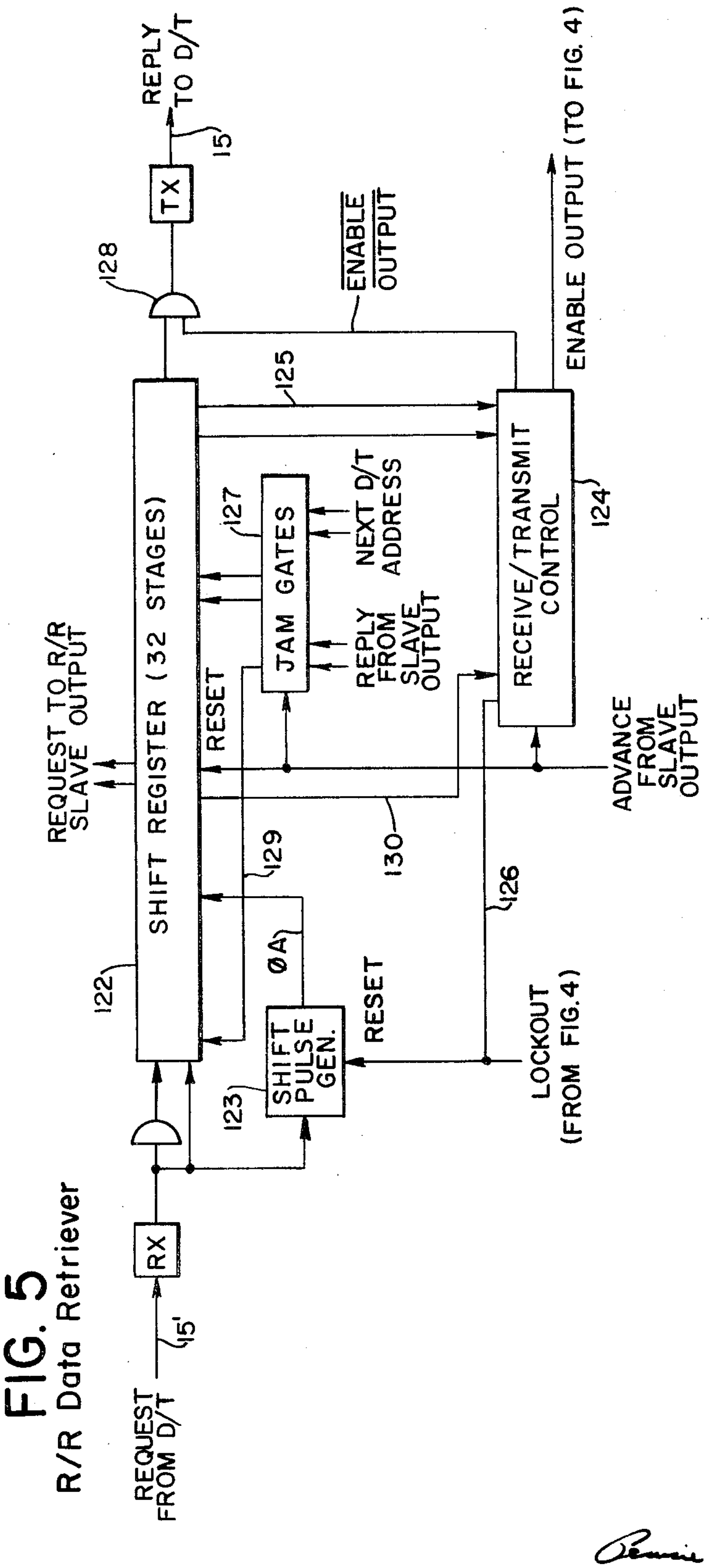
FIG. 5 is a block diagram of a Request/Reply data retriever.

Referring to FIG. 5, the R/R data retriever of U.S. Pat. No. 3,359,541 is shown in greatly simplified form. It is similar to that of Pat. 3,281,788, but includes the addressing of a plurality of data terminus units. A request from a D/T line via line 15' is supplied to a 32-stage shift register 122 and shifted in by $\phi$A pulses from generator 123. The latter is similar to that in FIG. 3. When the complete request is in the register the Receive-Transmit control circuits 124 recognize the sync pattern via lines 125 and stop generator 123 via line 126, and the request is supplied in parallel to the slave output as indicated.

When the reply data in the slave output unit is available, an ADVANCE signal is sent to the retriever and the reply data is supplied to jam gates 127. The leading edge of the ADVANCE signal resets register 122, and the trailing edge actuates the jam gates. The reply data is jammed into stages 15–26 of register 122. The address of the next data terminus is jammed into stages 27–30. Reset stages 31, 32 produce the initial two 1-bits of the sync pattern (FIG. 2*f*).

The Receive/Transmit control circuits 124 then release generator 123 and produce a low $\overline{\text{ENABLE}}$ $\overline{\text{OUTPUT}}$ signal to gate 128. The reply is thus shifted out to the TX and line 15 to the Data Terminus. During the transmission, ENABLE OUTPUT is high and is fed to inverter 105 of FIG. 4.

In the aforesaid patent and application the signal functioning as $\overline{\text{ENABLE}}$ $\overline{\text{OUTPUT}}$ remains low until a portion of the next request is entered into register 122. Here it is desired to make this signal high, and ENABLE OUTPUT low, as soon as the reply has been transmitted. This is accomplished by jamming a 1-bit into the first stage of register 122 via line 129 at the trailing edge of the ADVANCE signal. As the register is shifted to deliver the reply to output line 15, this 1-bit is shifted down the register. The status of the stage it reaches as the end of the reply is transmitted is sent via line 130 to control 124, and terminates the ENABLE OUTPUT signal. The resultant transition from high to low is inverted and differentiated to trigger TMIT FF104 in FIG. 4, as already described.

The LOCKOUT signal from gate 107 of FIG. 4 is applied to the reset input of generator 123 in FIG. 5, so that no shift pulses can be generated while the LOCKOUT signal is high. This prevents the R/R retriever from transmitting an R/R reply until the end of a QB message.

Generator 123 also functions to shift register 122 for an R/R request, as described above. Such a request largely overlaps a QB message, as shown in FIG. 2(*g*). Also, the RR reply may or may not be ready for transmission before the QB message ends, depending on the search time. Accordingly provision is made to develop the LOCKOUT signal only when an R/R reply is ready and a QB message has not yet ended. This is accomplished by supplying the output of gate 105 to the input of gate 107 in FIG. 4. ENABLE OUTPUT will be low during a request, and will remain low until a reply is ready for transmission. It is inverted by gate 105 to make the output of gate 107 low even though $\overline{\text{SEND}}$ is low. When ENABLE OUTPUT goes high for the next reply the inverted signal enables gate 107 and LOCKOUT goes high for the remainder of the QB message. If a reply is not ready until after the QB message has ended, the LOCKOUT signal will not be developed.

Figure 6:
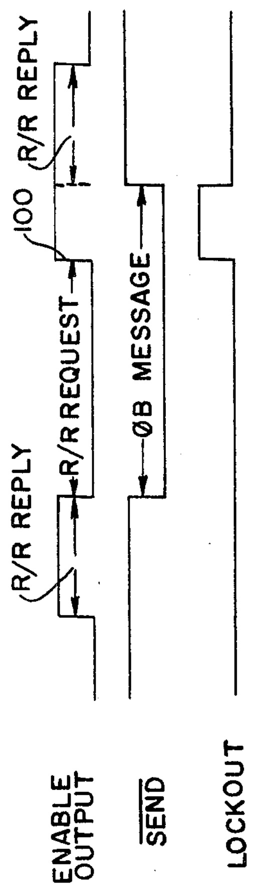
FIG. 6 shows waveforms illustrative of the operation of FIGS. 4 and 5.

FIG. 6 illustrates these relationships. A zero search time is assumed, with a reply ready at 100 but not transmitted until the QB message is completed. When the LOCKOUT signal goes low, generator 123 is released and the R/R reply is transmitted.

Figure 7:
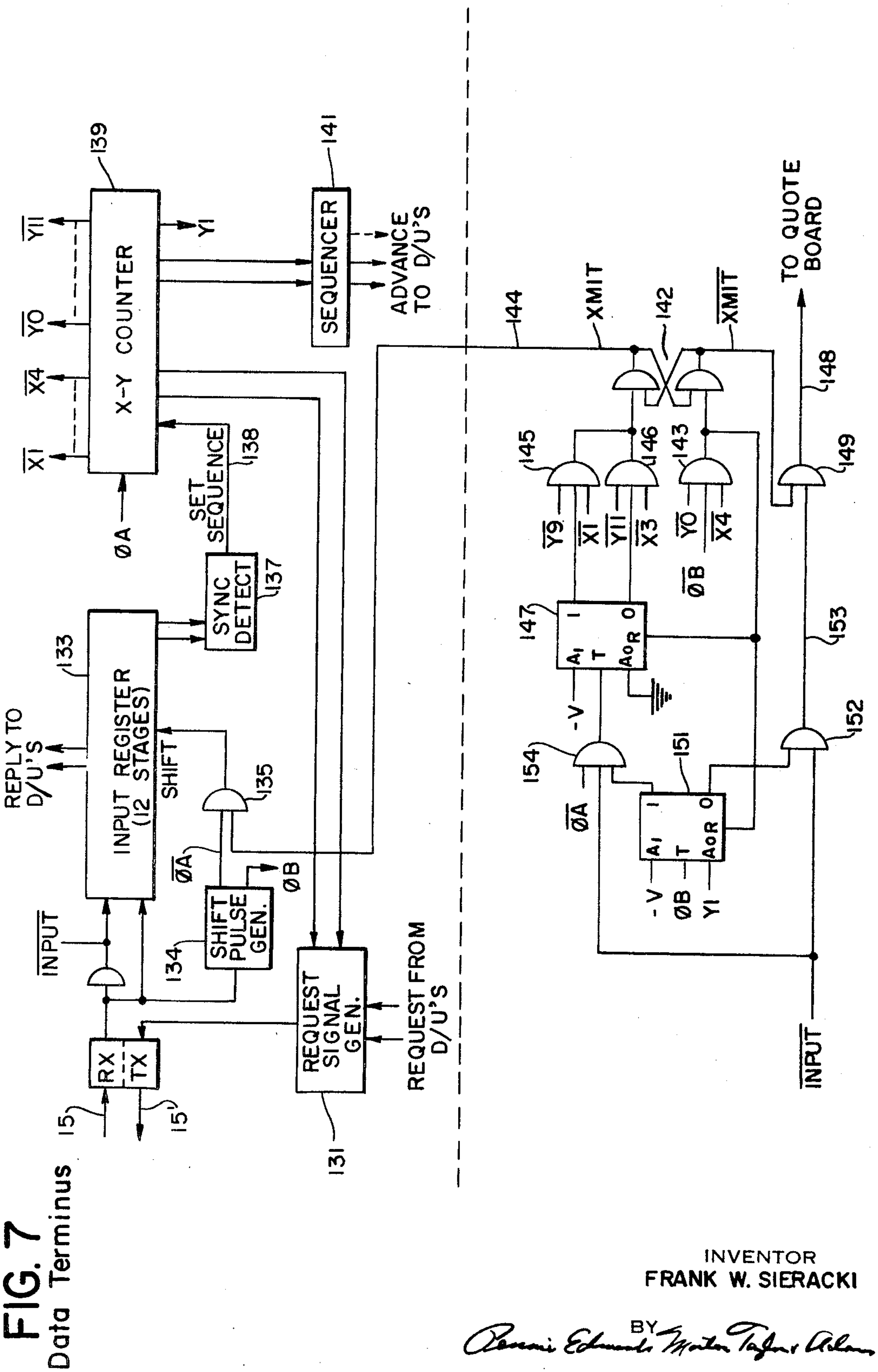
FIG. 7 shows a data terminus, partially in block and partially in logic form.

Referring to FIG. 7, the portion above the dashed line functions for the request/reply system and is similar to the data terminus units of U.S. Pat. No. 3,359,541 and Pat. No. 3,281,788. It is greatly simplified for present purposes.

A request from a D/U is supplied to a request signal generator 131 and forms a message as shown in FIG. 2(*e*) which is supplied via the TX to line 15'. A reply in line 15 is fed to a 12-stage shift register 133 and shifted therein by $\phi$A pulses from generator 134 (similar to that of FIG. 3) under the control of gate 135. When the sync pattern is in the last five stages, it is detected by 137 and produces a signal in line 138 which sets the sequence of X–Y counter 139.

The X–Y counter operates for both R/R request and reply, and is shown and described in detail in the aforesaid patent and application. A brief summary will suffice here. A recycling four-stage X counter section counts $\phi$A pulses, yielding successive counts X1 through X4, and triggers the Y counter section at the end of each cycle. Nine Y counting stages are used in the aforesaid application, yielding Y0 through Y8. Three additional stages Y9–Y11 are provided here, for purposes to be described.

For a request, the counter begins at X1–Y1 and continues through X4–Y8, giving 32 counts for the 32-bit request. When a corresponding reply is received, the presence of the five sync bits in the last five stages of register 133 is detected and used to set the counter to a count of X3. After five more counts the 12-bit price section of the reply will be in register 133, and the corresponding count of X4–Y0 stops the shifting of the register and the reply is supplied to the proper D/U. The X-Y counter continues counting, and the next count of X1–Y1 starts the sync pattern of the next request. The same count is used to supply a signal to sequencer 141 to enable the next D/U. In practice, due to the type of gates employed, the inverse (barred) X and Y signals are used rather than the unbarred signals.

The portion below the dashed line shows primarily modifications for the QB system, but includes the XMIT FF142 participating in the R/R system. The aforesaid count of X4–Y0 is recognized by gate 143 to which the corresponding barred signals are applied, and upon the occurrence of $\overline{\varphi B}$ the gate output goes high to set FF142. Line 144, designated XMIT, goes high to inhibit gate 135 and stop the shifting of register 133 at the end of the R/R reply. The reply is transferred to the proper D/U and a request from another D/U transmitted, as described above.

The reset circuits of XMIT FF142 are designed so that, if a QB message is received after the R/R reply, the FF remains set to inhibit gate 135 until the QB message ends, and then is reset promptly to permit receiving a reply. On the other hand, if a QB message is not received, FF142 is reset at the end of a request, so as to open gate 135 ready for the corresponding reply.

To this end, X-Y counter 139 is lengthened by three Y stages so as to be able to count the longerm QB message. Gate 145 is supplied with $\overline{\text{X1}}$ and $\overline{\text{Y9}}$ to recognize a count of 32 at the end of an R/R request. Gate 146 is supplied with $\overline{\text{Y3}}$ and $\overline{\text{Y11}}$ to recognize a count of 42 at the end of a QB message. One or the other of these gates is enabled by FF147 and resets FF142 at the end of the corresponding message.

Considering now the formation of a QB message to a quote board in line 148, during receipt of an R/R reply $\overline{\text{XMIT}}$ will be high and the output of gate 149 will be low. This is selected to correspond to marks or 1-bits in line 148. Thus line 148 will be continuously marking during the reply, forming the initial portion of the sync section of FIG. 2(*d*). At the end of the reply the high output of gate 143 sets FF142, making $\overline{\text{XMIT}}$ low to enable gate 149. The high output of gate 143 also resets FF147 and FF151. With FF151 reset, its high 0-output to gate 152 makes line 153 low, thereby making the output of gate 149 high and delivering a space or 0-bit to output line 148. This completes the sync pattern of the QB message of FIG. 2(*d*), and occurs during the bit interval allocated to the initial sync section of a quote board message of FIG. 2(*c*), if such is present. If no QB message is being received, line 148 will continue with spaces, and no information will be sent to the quote board.

If there is a QB message, it will be present in the $\overline{\text{INPUT}}$ signal to gate 152, this being obtained from the transmission line 15 at the input to register 133, as indicated. The initial 1-bit of a QB message (FIG. 2(*c*)) corresponds to a low $\overline{\text{INPUT}}$ signal. This has no effect on gate 152, but enables gate 154. The latter is further enabled by the low 1-output of FF151 and passes the next $\varphi$A pulse to set FF147. This inhibits gate 145 and enables gate 146, so that the end of a QB message will thereafter be recognized.

The $\varphi$A pulse occurring during the first 1-bt of the QYB message will be counted in the X–Y counter and make Y1 high. This steers FF151 toward set, and the following $\varphi B$ pulse sets FF151. This inhibits gate 154 so that FF147 remains set. It also enables gate 152 so that the SIC and subsequent portions of the QB message pass through gates 152 and 149 to output line 148. It will be noted that, due to the double inversion of gates 152 and 149, low values of $\overline{\text{INPUT}}$ appear as low values in output line 148 and marks or 1-bits are transmitted. High values of $\overline{\text{INPUT}}$ appear as high values in line 148, and spaces or 0-bits are transmitted. The relative polarities may of course be changed if required for the utilizing equipment.

At the end of the QB message, gate 146 resets FF142, making XMIT to gate 135 low, so that register 133 is ready for the next R/R reply. If there had not been a QB message, FF147 would have remained reset, thus enabling gate 145 to reset FF142 at the end of an R/R request. In either case, the resultant high $\overline{\text{XMIT}}$ to gate 149 will cause line 148 to start marking continuously until the end of the next reply.

It will be noted that the delay in resetting FF142 when a QB message is being received both prevents the end of the QB message from entering the R/R register 133, by keeping gate 135 closed to prevent shifting, and avoids cutting off the end of the QB message in line 148 by the closing of gate 149. Eliminating the delay when a QB message is not being received provides for an R/R reply transmitted after only a short search time.

If an R/R reply is transmitted from the R/R retriever immediately after a QB message is transmitted, the sync pattern in the message to the quote board will have a number of 1-bits equal to the number of bits in the reply, here assumed to be seventeen. By developing this major portion of the sync pattern during the reply, no delay is involved in retransmitting the data portion of the QB message, and no storage of the data portion is required. If a reply is not transmitted immediately, due to a longer search time, more than seventeen 1-bits will be supplied to output line 148, but will not adversely affect operation of the quote board.

In the foregoing, the end of an R/R reply from a data retriever starts a QB message transmission. It should be understood that it is not necessary for actual requests to be entered into desk units in order for QB transmissions to take place. In the R/R systems of the aforesaid patent and application, a request is transmitted from a data terminus whether or not a desk unit is making a true request. That is, the sync pattern is sent out followed by, say, all 0-bits. This is treated at the slave output unit as an invalid request, and an arbitrary reply sent back. Similarly, if an actual request has an SIC when is in error or for a stock not on the drum, or a category has not been inserted, an arbitrary reply is sent back. Thus, so long as the data terminus is functioning, replies will be sent out repeatedly by an R/R retriever whether meaningful or not, and accordingly QB messages will be transmitted promptly after they are received by the QB converter.

With a plurality of data terminus units connected to a single R/R data retriever, as shown in FIG. 1, when one D/T has made a request and received a reply, the next D/T is enabled, etc. However, all replies go to all D/T's connected to a given D/R, even though only one D/T effectively acts on a given reply to send the information to the requesting desk unit. As explained in detail in U.S. Pat. No. 3,359,541, the data collectors connected to a given data terminus participate in this functioning, and there is additional transmission control at the data terminus. These details have been omitted here to avoid further complexity. For present purposes, it suffices to point out that a QB message from a given D/R goes to all D/T's connected thereto, and may be supplied by each D/T to the quote boards connected thereto, regardless of which D/T has transmitted an R/R request and utilized the corresponding reply.

In practice various test circuits are incorporated in the apparatus shown, including a parity check of messages transmitted by the QB retrievers, to insure correct operation and facilitate trouble-shooting.

It will be understood that the multiplex system here described may be used with request/reply and quote board systems other than those specifically described in the referenced patent and applications, with suitable modifications where required. Also, changes in the detailed circuitry may be made, as desired. Specific message formats have been described which are used in practice, but it will be understood that the invention is not limited thereto.

I claim:

1. A multiplex system for multiplexing replies in a request/reply data retrieval system with updating messages in a quote board display system, said request/reply system including a memory for storing data, a plurality of request units, and data retriever and data terminus means connected by request and reply transmission circuits, said data retriever means including means responsive to requests for obtaining reply data from said memory and transmitting corresponding replies, said data terminus means including means responsive to said request units for transmitting requests to said data retriever means and means for supplying data in corresponding replies to corresponding request units; and quote board system including a quote board and a source of updating quote board message data; said multiplex system comprising (a) means for transmitting updating quote board messages having an initial predetermined sync section on said reply transmission circuit to said data terminus means, (b) means responsive to the end of a reply at said said data retriever means for initiating the transmission of a said quote board message at a predetermined interval thereafter, (c) means at said data terminus means for transmitting an initial portion of a sync section to a quote board during the receipt of a said reply and a final portion during the interval allocated to the initial sync section of a received quote board message, and (d) means at said data terminus means for supplying the data in a received quote board message to said quote board.

2. A system according to claim 1 in which said means at the data terminus means for supplying data in a received quote board message to said quote board is responsive to the end of a reply thereat.

3. A system according to claim 1 in which said initiating of the transmission of a quote board message is in the next bit interval after the end of a reply, said predetermined sync section of a quote board message is a single identifying bit, and said final portion of the sync section to a quote board is a single identifying bit following the end of a reply received at said data terminus means.

4. A system according to claim 1 including storage means for storing an updating quote board message from said source, and means responsive to the presence of a message in said storage means and to the end of a said reply at the data retriever means for delivering the stored message to said reply transmission circuit.

5. A system according to claim 1 including means for inhibiting transmission of a said reply during the transmission of a said quote board message.

6. A system according to claim 1 in which said data retriever means includes means for producing a signal when a said reply is ready for transmission, and said multiplex system includes means responsive to said signal and to the transmission of a quote board message for inhibiting the transmission of a reply during intervals when a reply is ready and a quote board message is being transmitted.

7. A system according to claim 1 in which a quote board message in said reply transmission circuit is longer than a request in said request transmission circuit and said data terminus means includes a register for receiving a said reply, and including means responsive to the end of a reply for inhibiting said register from receiving data from said reply transmission circuit, means for enabling transmission of a request after receipt of a reply, means responsive to the transmission of a request for enabling said register, and means responsive to the receipt of a quote board message for delaying the enabling of said register until the end of said message.

8. A system according to claim 1 in which said request/reply system includes a plurality of data retriever and data terminus means connected by respective request and reply transmission circuits, said multiplex system including (a) a first unit for receiving and storing updating quote board message data from said source,
(b) a plurality of second units including respective storage means for receiving and storing message data,
(c) means for transferring message data from said first unit simultaneously to said plurality of second units,
(d) said second units being connected to respectively reply transmission circuits of said plurality of data retriever means,
(e) said second units including respective means responsive to the presence of message data in the respective storage means and to the end of a reply at the respective data retriever means for transmitting respective quote board messages containing said message data, and
(f) means jointly responsive to the absence of message data in said second units for enabling the transfer thereto of message data from said first unit.

9. A system according to claim 8 in which quote board messages in said reply transmission circuits are longer than requests in said request transmission circuits, each data retriever means includes means for producing a signal when a reply is ready for transmission, and each data terminus means includes a register for receiving a reply, means responsive to the end of a reply for inhibiting said register from receiving data from the respective reply transmission, means for enabling transmission of a request after receipt of a reply, and means responsive to the transmission of a request for enabling said register; said multiplex system including means at each said data retriever means responsive to the said signal thereat and to the transmission of a quote board message in the respective reply circuit for inhibiting the transmission of a respective reply during intervals when a reply is ready and a quote board message is being transmitted, and means at each data terminus means responsive to the receipt of a quote board message thereat for delaying said enabling of the respective register until the end of said message.

10. A system according to claim 9 in which the initiating of the transmission of quote board messages is in the next bit interval after the end of replies at the data retriever means, respectively, the predetermined sync section of the quote board messages is a single identifying bit, and the final portion of the sync section from the data terminus means to respective quote boards is a single identifying bit following the end of respective replies received thereat.

11. A system according to claim 10 in which message data is transferred from said first unit to said second units in a substantially shorter time than messages are transmitted from said second units to respective reply transmission circuits.

References Cited

UNITED STATES PATENTS

| | | | |
|---|---|---|---|
| 3,281,788 | 10/1966 | Hernan et al. | 340—152 |
| 3,377,619 | 4/1968 | Marsh et al. | 340—152 X |
| 3,416,134 | 12/1968 | Gertler et al. | 340—154 |

JOHN W. CALDWELL, Primary Examiner

M. SLOBASKY, Assistant Examiner

U.S. Cl. X.R.

340—152